(12) United States Patent
Maeda et al.

(10) Patent No.: US 8,505,089 B2
(45) Date of Patent: Aug. 6, 2013

(54) IMAGE FORMING APPARATUS AND CONTROL METHOD FOR IMAGE FORMING APPARATUS

(75) Inventors: Tetsuya Maeda, Osaka (JP); Wataru Tsukuda, Osaka (JP)

(73) Assignee: Kyocera Mita Corporation (JP)

( * ) Notice: Subject to any disclaimer, the term of this patent is extended or adjusted under 35 U.S.C. 154(b) by 0 days.

(21) Appl. No.: 13/334,756

(22) Filed: Dec. 22, 2011

(65) Prior Publication Data

US 2012/0167201 A1 Jun. 28, 2012

(30) Foreign Application Priority Data

Dec. 27, 2010 (JP) .................................. 2010-290392
Dec. 27, 2010 (JP) .................................. 2010-290393

(51) Int. Cl.
*G06F 7/04* (2006.01)

(52) U.S. Cl.
USPC .......... 726/17; 726/2; 726/3; 726/18; 726/19; 726/20; 726/26; 726/27; 726/28; 713/155

(58) Field of Classification Search
USPC ........................................................... 726/17
See application file for complete search history.

(56) References Cited

U.S. PATENT DOCUMENTS

| | | | | |
|---|---|---|---|---|
| 5,664,194 | A * | 9/1997 | Paulsen | 717/178 |
| 5,845,102 | A * | 12/1998 | Miller et al. | 712/211 |
| 5,963,725 | A * | 10/1999 | Inoue | 703/17 |
| 6,003,095 | A * | 12/1999 | Pekowski et al. | 717/163 |
| 6,044,454 | A * | 3/2000 | Schwarz et al. | 712/201 |
| 6,104,399 | A * | 8/2000 | Volkel | 715/841 |
| 8,045,877 | B2 * | 10/2011 | Nakagoshi | 399/81 |
| 8,397,277 | B2 * | 3/2013 | Tsujimoto | 726/3 |
| 2006/0136992 | A1* | 6/2006 | Shigeeda | 726/2 |
| 2007/0079363 | A1 | 4/2007 | Itoh | |
| 2007/0083752 | A1 | 4/2007 | Kanou et al. | |
| 2009/0045911 | A1* | 2/2009 | Bauchot et al. | 340/5.8 |
| 2009/0100515 | A1 | 4/2009 | Masui | |
| 2009/0112791 | A1* | 4/2009 | Nakagoshi | 707/1 |

(Continued)

FOREIGN PATENT DOCUMENTS

| | | |
|---|---|---|
| JP | 2005-300605 | 10/2005 |
| JP | 2007-97024 | 4/2007 |
| JP | 2007-279131 | 10/2007 |

*Primary Examiner* — Kambiz Zand
*Assistant Examiner* — Yonas Bayou
(74) *Attorney, Agent, or Firm* — Gerald E. Hespos; Michael J. Porco; Matthew T. Hespos

(57) ABSTRACT

An image forming apparatus includes a display unit, a login information storage unit, a login information reception unit, a login authentication unit, an authorization limitation information storage unit, an execution instruction reception unit, a control unit and an execution permission determination unit. The authorization limitation information storage unit stores functions permitted to be executed by the logged-in user and a default user, who is a non-logged-in user. The control unit executes a function in accordance with an execution instruction received by the execution instruction reception unit. The execution permission determination unit determines whether the function indicated in the received execution instruction is a default function that is permitted to be executed by the default user, causes the control unit to execute the function if the function is the default function, and displays the login screen on the display unit if the function is not the default function.

6 Claims, 7 Drawing Sheets

U.S. PATENT DOCUMENTS

| | | |
|---|---|---|
| 2010/0011439 A1 | 1/2010 | Takiyama |
| 2010/0115608 A1 | 5/2010 | Uchikawa |
| 2010/0235888 A1 | 9/2010 | Miyamoto |
| 2010/0238481 A1* | 9/2010 | Homma ........................ 358/1.14 |
| 2010/0332823 A1* | 12/2010 | Tsujimoto ..................... 713/155 |
| 2012/0260333 A1 | 10/2012 | Uchikawa |

* cited by examiner

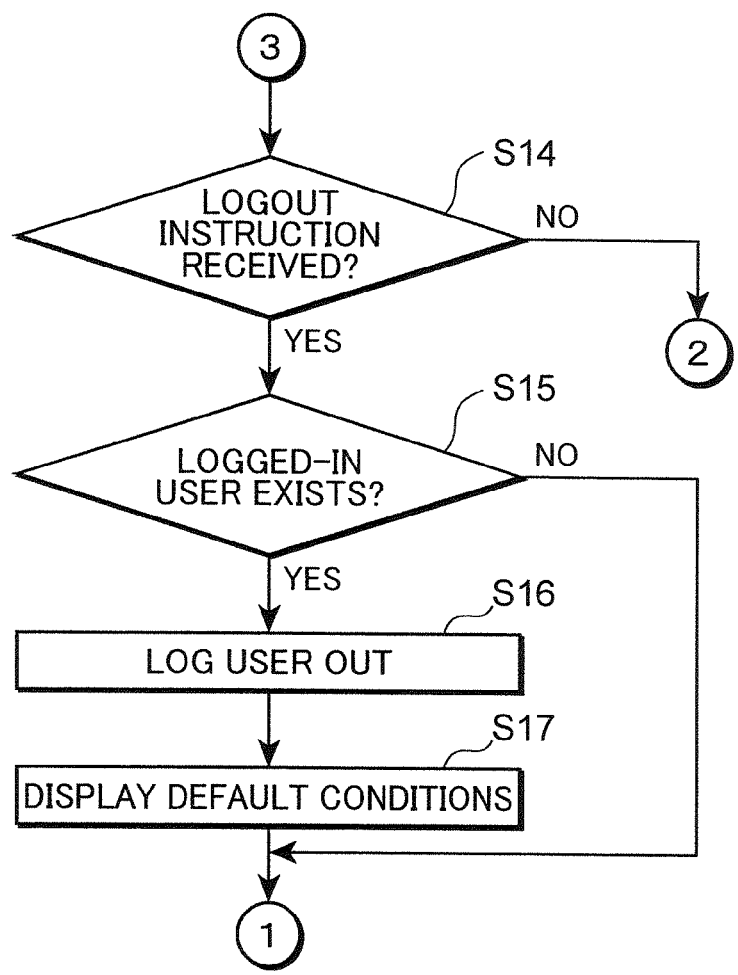

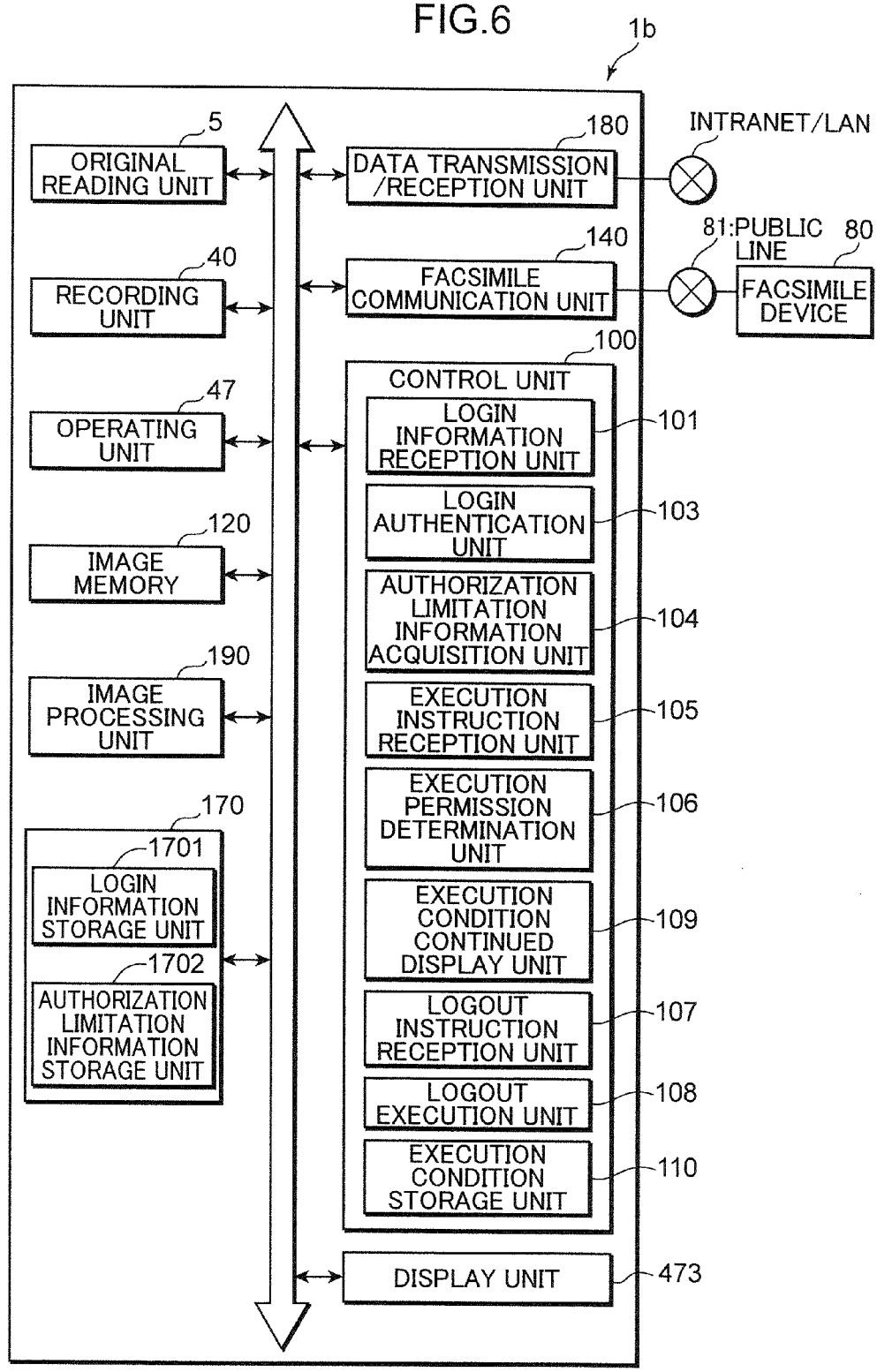

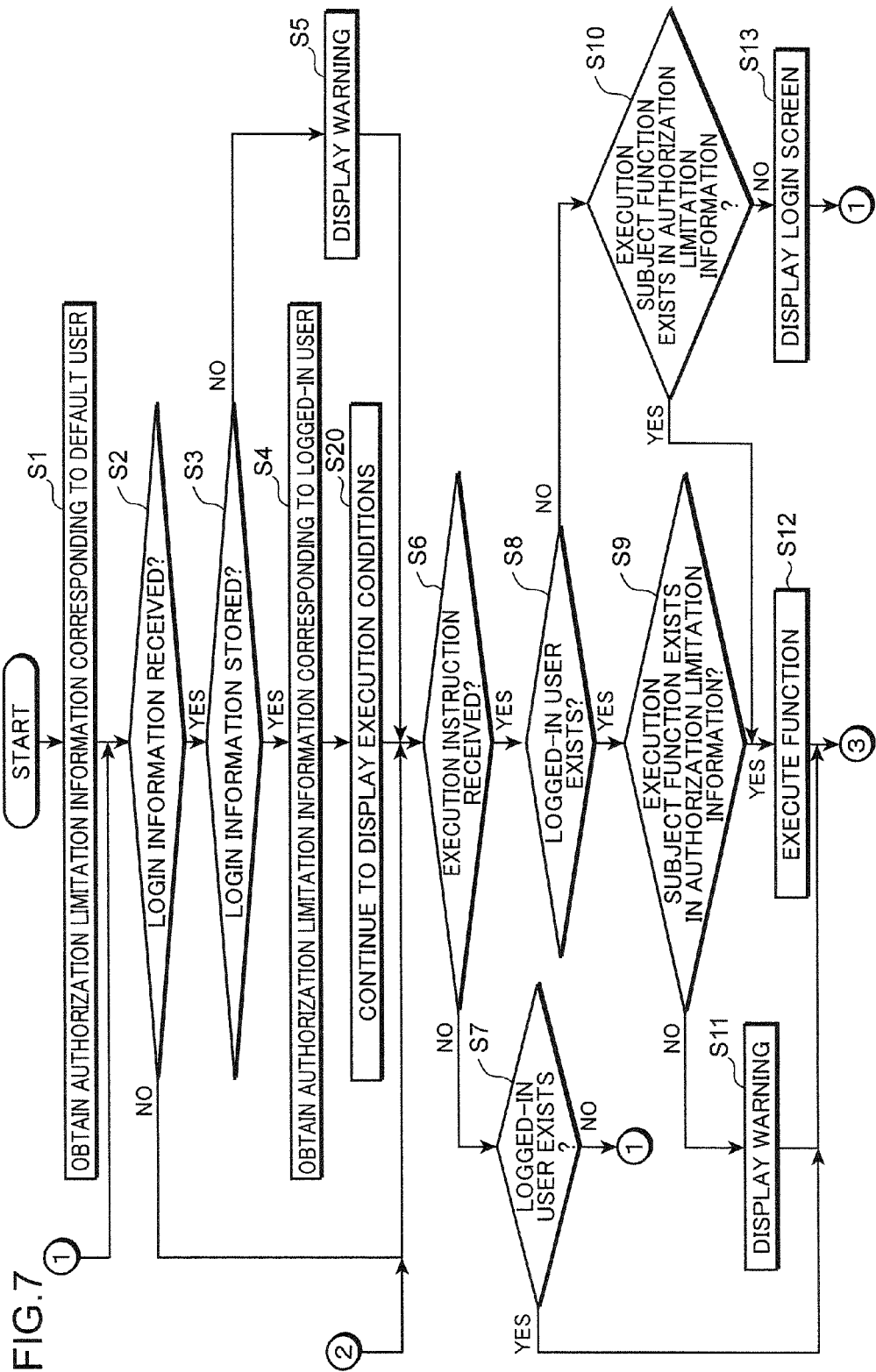

IMAGE FORMING APPARATUS AND CONTROL METHOD FOR IMAGE FORMING APPARATUS

CROSS REFERENCE TO RELATED APPLICATION

This application is based on Japanese Patent Appl. Nos. 2010-290392 and 2010-290393 filed in the Japan Patent Office on Dec. 27, 2010, the contents of which are hereby incorporated by reference.

BACKGROUND OF THE INVENTION

1. Field of the Invention

The present disclosure relates to a technique for performing control to permit or prohibit execution of respective functions that can be executed by an image forming apparatus.

2. Description of the Related Art

In a known conventional technique, rights permitting or prohibiting the execution of respective functions that can be executed by an image forming apparatus such as a printer are set for each registered user of the image forming apparatus, and when an execution instruction relating to a function is received from a logged-in user, execution of the function is permitted or prohibited in accordance with the rights set in relation to the user.

Further, in a proposed technique, use of the respective functions by an unauthenticated public user who has not input a user name and a password is permitted or prohibited on the basis of predetermined public registration information indicating whether or not use of the respective functions is permitted. According to this technique, labor required to set rights permitting or prohibiting execution of the respective functions in relation to all users can be avoided.

With this technique, however, when an unauthenticated public user inputs an execution instruction relating to a function that public users are not permitted to execute, a sound is issued from a speaker portion to indicate that execution of the function is prohibited. As a result, the public user realizes that execution of the function is prohibited. To execute the function thereafter, a laborious operation must be performed to authenticate a user who is permitted to execute the function.

An object of the present disclosure is to provide an image forming apparatus and a control method for the image forming apparatus with which it is possible to reduce an amount of labor required by a default user, i.e. a user who is not logged in, to log in as a user who is permitted to execute a function that is not permitted to be executed by a default user in order to execute the function.

SUMMARY OF THE INVENTION

To achieve the object described above, an image forming apparatus according to an aspect of the present disclosure includes a display unit, a login information storage unit, a login information reception unit, a login authentication unit, an authorization limitation information storage unit, an execution instruction reception unit, a control unit and an execution permission determination unit. The display unit displays respective setting screens for inputting execution conditions relating to respective functions that can be executed by the image forming apparatus. The login information storage unit stores login information for authenticating a user having permission to use the image forming apparatus in advance. The login information reception unit receives the login information, which is input into a login screen serving as the setting screen for inputting the login information. The login authentication unit logs in a user identified by the login information received by the login information reception unit, when the received login information is stored in the login information storage unit. The authorization limitation information storage unit that stores functions permitted to be executed respectively by the logged-in user and a default user, who is a non-logged-in user. The execution instruction reception unit displays the setting screen corresponding to the function that can be executed by the image forming apparatus on the display unit and receives an execution instruction to execute the function in accordance with the execution conditions input into the setting screen by the logged-in user or the default user. The control unit that executes the function in accordance with the execution conditions indicated in the execution instruction received by the execution instruction reception unit. The execution permission determination unit which, when the execution instruction input by the default user is received by the execution instruction reception unit, determines whether or not the function of an execution subject indicated in the received execution instruction is a default function, which is a function that is permitted to be executed by the default user, stored in the authorization limitation information storage unit, causes the control unit to execute the function after determining that the function is the default function, and displays the login screen on the display unit after determining that the function is not the default function.

To achieve the object described above, a control method for an image forming apparatus according to another aspect of the present disclosure includes an execution step, a first display step, a determination step and a second display step. The execution step executes, as an initial mode in which an operation of the image forming apparatus is started, a default user mode in which a user who operates the image forming apparatus is not logged in, from among a logged-in user mode in which the user who operates the image forming apparatus is logged in and the default user mode. The first display step displays a setting screen for inputting an execution condition for causing the image forming apparatus to execute a function in the default user mode executed in the execution step. The determination step determines, when the execution condition is input into the setting screen displayed in the first display step, whether or not the input execution condition is an execution condition of a function assigned to a default user. The second display step displays a login screen for inputting login information required to advance to the logged-in user mode without requiring the user to perform an operation, when the input execution condition is determined in the determination step not to be the execution condition of the function assigned to the default user.

BRIEF DESCRIPTION OF THE DRAWINGS

FIG. 5 is a flowchart showing an example of a second half of the operation for determining whether to permit or prohibit execution of a function in the first embodiment;

FIG. 6 is a schematic block diagram showing an internal configuration of the multifunction device according to the second embodiment; and FIG. 7 is a flowchart showing an example of an operation for determining whether to permit or prohibit execution of a function in the second embodiment.

DETAILED DESCRIPTION OF THE PREFERRED EMBODIMENTS

First Embodiment

Figure 1:
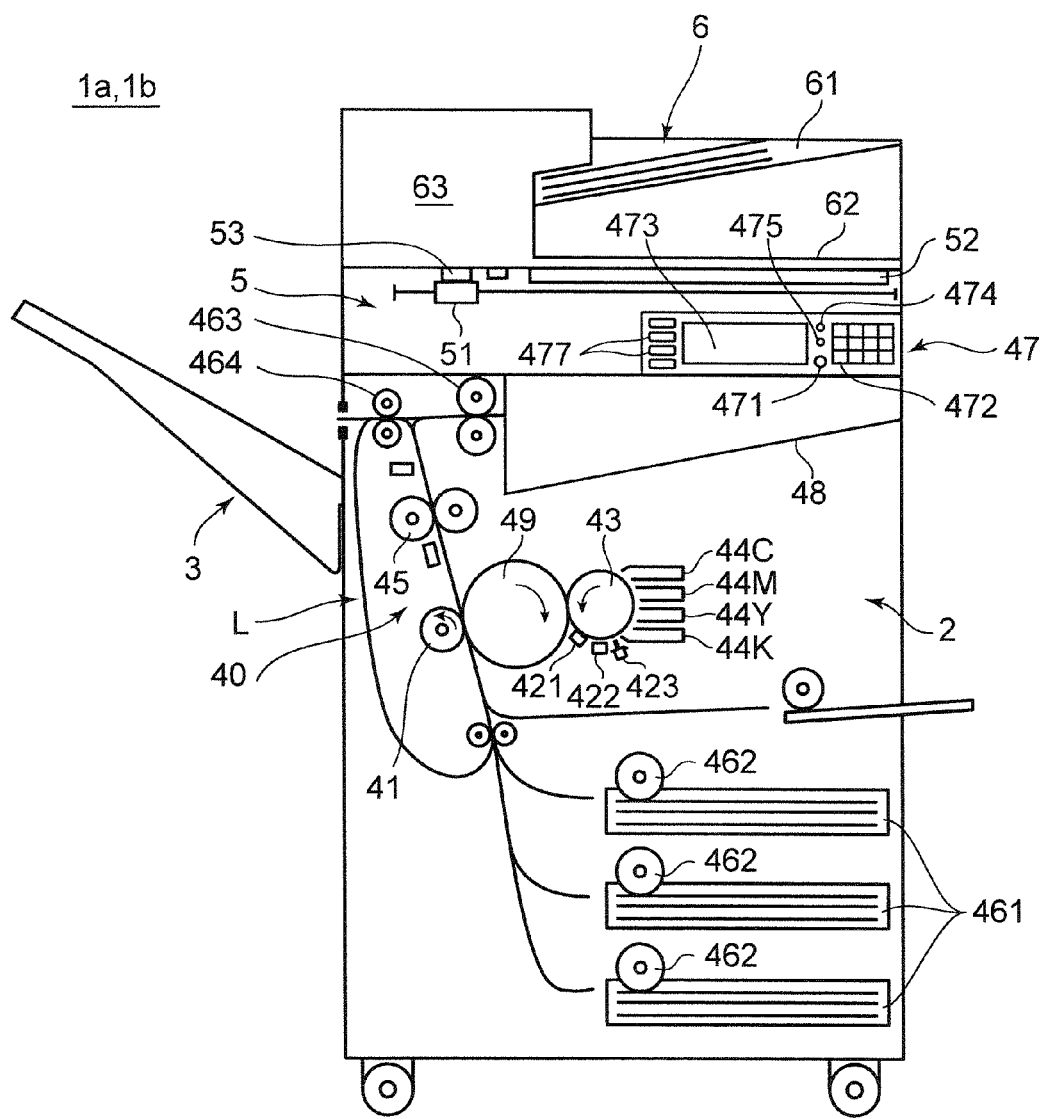
FIG. 1 is a schematic side view showing an external configuration of a multifunction device according to first and second embodiments of the present disclosure.

An image forming apparatus according to a first embodiment of the present disclosure will be described below with reference to the drawings. FIG. 1 is a schematic side view showing an external configuration of a multifunction device 1a serving as the image forming apparatus according to the first embodiment of the present disclosure. FIG. 1 is also a schematic side view showing an external configuration of a multifunction device 1b serving as an image forming apparatus according to a second embodiment. The multifunction device 1a includes multiple functions such as a copy function, a printer function, a scanner function, and a facsimile function.

The multifunction device 1a includes a main body portion 2, a stacking tray 3 disposed on a left side of the main body portion 2, an original reading unit 5 disposed on an upper portion of the main body portion 2, and an original feeding unit 6 disposed above the original reading unit 5.

Further, an operating unit 47 is provided on a front portion of the multifunction device 1a. The operating unit 47 is provided with a start key 471 with which a user inputs execution instructions relating to the respective functions that can be executed by the multifunction device 1a, a numerical keypad 472 for inputting execution conditions relating to the respective functions, such as a number of prints, a display unit 473 constituted by a liquid crystal display or the like that displays setting screens and so on for inputting the execution conditions relating to the respective functions and has a touch panel function for inputting various items, a reset key 474 for resetting setting content and the like set on the display unit 473, a stop key 475 for stopping a function that is underway, and a function switch key 477 for switching between the copy function, the printer function, the scanner function, and the facsimile function.

The original reading unit 5 includes a scanner unit 51 constituted by a charge coupled device (CCD) sensor, an exposure lamp, and so on, a platen 52 constituted by a transparent member made of glass or the like, and an original reading slit 53.

The scanner unit 51 can be moved by a driving unit, not shown in the drawing. When an original placed on the platen 52 is to be read, the scanner unit 51 is moved over an original surface in a position opposing the platen 52 such that image data obtained while scanning an original image are output to a control unit 100 (FIG. 2), to be described below. Further, when an original fed by the original feeding unit 6 is to be read, the scanner unit 51 is moved to a position opposing the original reading slit 53 such that the original image is obtained via the original reading slit in synchronization with an original conveyance operation performed by the original feeding unit 6. The resulting image data are output to the control unit 100.

The original feeding unit 6 includes an original carrying plate 61 on which the original is placed, an original discharge unit 62 for discharging an original that has undergone image reading, and an original conveyance mechanism 63 constituted by a sheet feeding roller (not shown), a conveyance roller (not shown), and so on in order to feed an original placed on the original carrying plate 61 one sheet at a time, convey the original to a position opposing the original reading slit 53, and discharge the original to the original discharge unit 62.

The original conveyance mechanism 63 includes a sheet reversing mechanism (not shown) for turning the original back to front and conveying the original back to the position opposing the original reading slit 53. Thus, images on both surfaces of the original can be read by the scanner unit 51 through the original reading slit 53.

Further, the original feeding unit 6 is provided to be free to rotate relative to the main body portion 2 so that a front surface side thereof can move upward. By moving the front surface side of the original feeding unit 6 upward so as to expose an upper surface of the platen 52, a user can place an original to be read, for example an open book or the like, on the upper surface of the platen 52.

The main body portion 2 includes a plurality of sheet feeding cassettes 461, a sheet feeding roller 462 for feeding recording sheets one at a time from the sheet feeding cassettes 461 and conveying the recording sheets to a recording unit 40, and the recording unit 40, which forms images on the recording sheets conveyed from the sheet feeding cassettes 461.

The recording unit 40 includes a neutralization unit 421 that neutralizes a residual charge on a front surface of a photosensitive body drum 43, a charging unit 422 that charges the neutralized front surface of the photosensitive body drum 43, an exposure unit 423 that exposes the front surface of the photosensitive body drum 43 by outputting a laser beam on the basis of the image data obtained by the scanner unit 51 in order to form an electrostatic latent image on the front surface of the photosensitive body drum 43, development units 44K, 44Y, 44M, 44C that form toner images in respective colors cyan (C), magenta (M), yellow (Y), and black (B) on the photosensitive body drum 43 on the basis of the electrostatic latent image, a transfer drum 49 onto which the toner images in the respective colors formed on the photosensitive body drum 43 are transferred and overlapped, a transfer unit 41 that transfers the toner image on the transfer drum 49 onto a sheet, a fixing unit 45 that heats the sheet onto which the toner image has been transferred to fix the toner image onto the sheet, conveyance rollers 463, 464 provided on a sheet conveyance path through the recording unit 40 in order to convey the recording sheet to the stacking tray 3 or the discharge tray 48, and so on.

When an image is to be formed on both surfaces of the recording sheet, an image is formed on one surface of the recording sheet by the recording unit 40, whereupon the recording sheet is nipped between the conveyance rollers 463 on the discharge tray 48 side. In this condition, the conveyance rollers 463 are caused to rotate in reverse such that the recording sheet is switched back, whereupon the recording sheet is re-conveyed to an upstream region of the recording unit 40 along a sheet conveyance path L. An image is then formed on the other surface by the recording unit 40, whereupon the recording sheet is discharged to the stacking tray 3 or the discharge tray 48.

Figure 2:
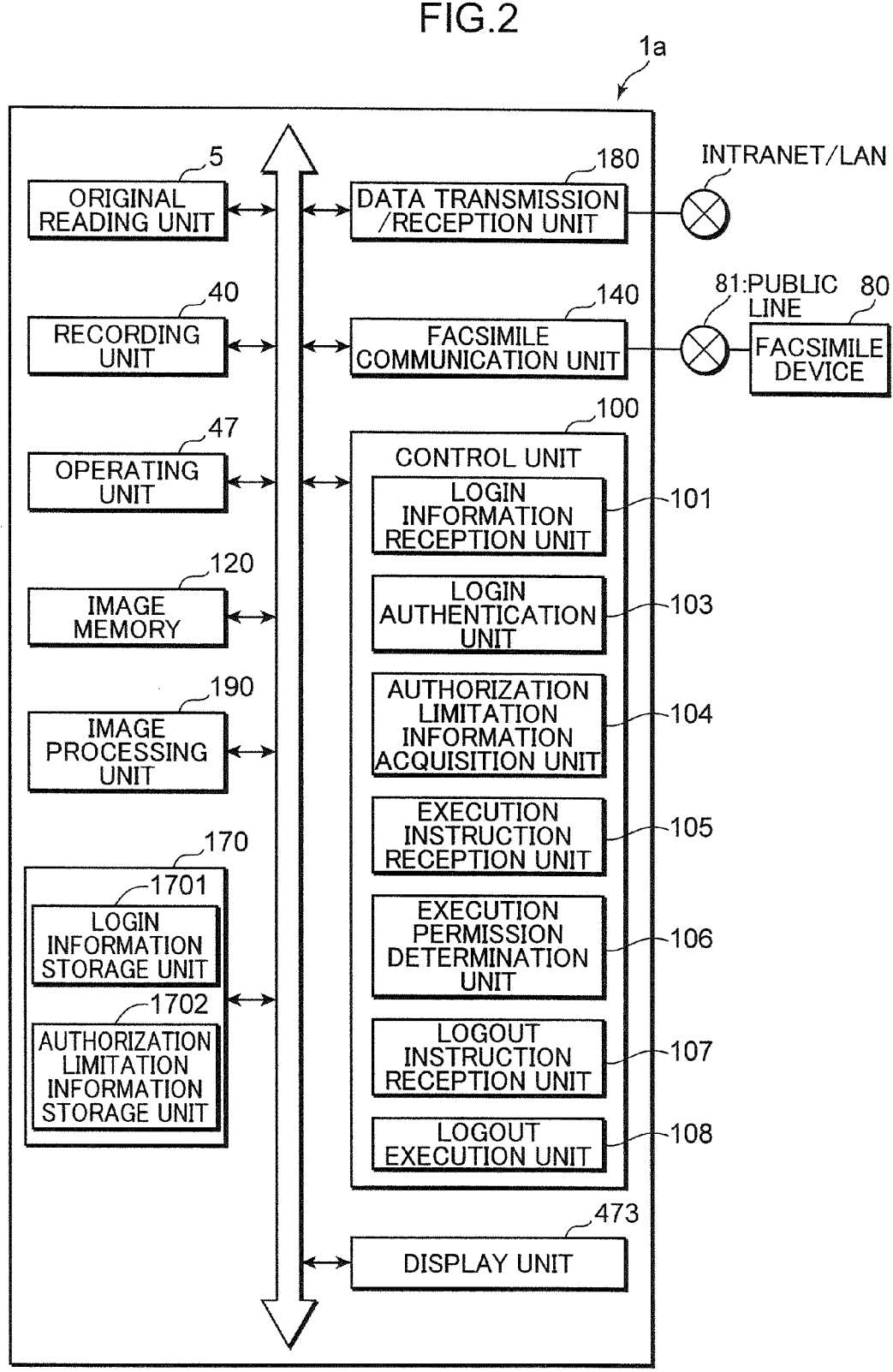
FIG. 2 is a schematic block diagram showing an internal configuration of the multifunction device according to the first embodiment.

FIG. 2 is a schematic block diagram showing the internal configuration of the multifunction device 1a. The multifunction device 1a includes the control unit 100 for controlling the functions of each part of the device, the original reading unit 5 described above, an image memory 120 that temporarily stores original image data read by the original reading unit 5 and so on, the recording unit 40 described above, the operating unit 47 described above, and the display unit 473 constituted by a liquid crystal display (LCD) or the like, which forms a part of the operating unit 47.

The operating unit 47 is configured such that the user can perform various input operations on respective setting screens either by performing a depression operation on the numerical keypad 472 in accordance with operation guidance displayed on the display unit 473 or by performing a touch operation on an operating button (a numerical keypad, a keyboard, or the like) displayed on the display unit 473 using the touch panel function, for example.

The multifunction device 1a further includes a facsimile communication unit 140, an HDD 170, a data transmission/reception unit 180, and an image processing unit 190.

The facsimile communication unit 140 executes various functions required for facsimile communication in order to transmit and receive image data to and from an external facsimile device 80 over a public line 81.

The HDD 170 is constituted by a magnetic disk, for example, and functions as a login information storage unit 1701 and an authorization limitation information storage unit 1702.

The login information storage unit 1701 stores login information for authenticating a user having permission to use the multifunction device 1a in advance. More specifically, the login information is constituted by a combination of user identification information and a password.

The authorization limitation information storage unit 1702 stores authorization limitation information indicating, in association with the user identification information of each user, a combination of functions that a user identified by the user identification information is permitted to execute.

Figure 3:
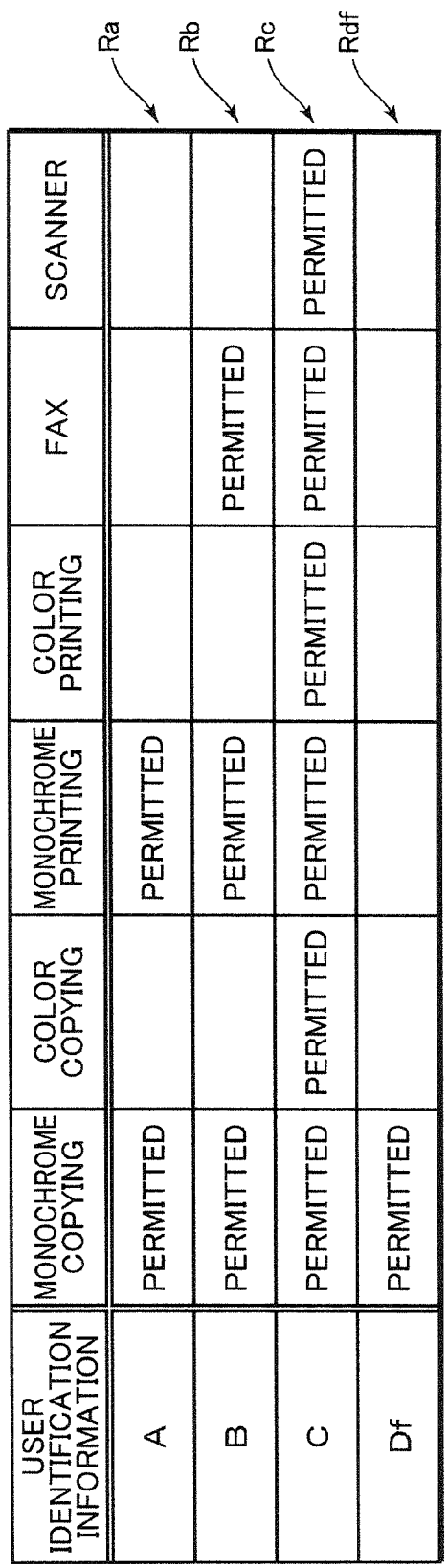
FIG. 3 is an illustrative view showing an example of functions that are permitted to be executed by respective users, which are stored in an authorization limitation information storage unit.

For example, as shown in FIG. 3, the authorization limitation information storage unit 1702 stores authorization limitation information Ra to Rc, Rdf in association with user identification information A to C relating to users having permission to use the multifunction device 1a in advance and user identification information Df for identifying a default user, i.e. a user who has not been logged in by a login authentication unit to be described below.

In this example, the authorization limitation information Ra indicates that a user identified by the user identification information A is permitted to execute a monochrome copy function constituted by the original reading unit 5, the recording unit 40, and so on, and a monochrome printer function constituted by the data transmission/reception unit 180, the recording unit 40, and so on.

Similarly, the authorization limitation information Rb indicates that a user identified by the user identification information B is permitted to execute the monochrome copy function, the monochrome printer function, and a facsimile (FAX) communication function constituted by the facsimile communication unit 140 and so on, while the authorization limitation information Rc indicates that a user identified by the user identification information C is permitted to execute the monochrome copy function, a color copy function constituted by the original reading unit 5, the recording unit 40, and so on, the monochrome printer function, a color printer function constituted by the data transmission/reception unit 180, the recording unit 40, and so on, the FAX communication function, and a scanner function constituted by the original reading unit 5, the image memory 120, and so on.

Further, the authorization limitation information Rdf indicates that the monochrome copy function is a default function, which is a function that is permitted to be executed by a user identified by the user identification information Df, or in other words a default user.

The data transmission/reception unit 180 receives data and the like to be recorded by the recording unit 40 from a network-connected personal computer or the like via the Intranet or a local area network (LAN).

The image processing unit 190 performs editing/finishing processing (encoding/decoding processing, enlargement/reduction processing, compression/expansion processing) and the like on the image data read by the original reading unit 5.

The control unit 100 includes a CPU, a ROM storing a control program and so on for controlling an image formation operation and operating programs of the respective parts of the apparatus, a RAM that functions as a working area and temporarily stores the image data and so on, and a memory such as a non-volatile memory for storing set values of various control parameters. The control unit 100 controls the operations of the respective parts of the apparatus by having the CPU execute the operating programs stored in the ROM.

Further, the control unit 100 functions as a login information reception unit 101, a login authentication unit 103, an authorization limitation information acquisition unit 104, an execution instruction reception unit 105, an execution permission determination unit 106, a logout instruction reception unit 107, and a logout execution unit 108.

The login information reception unit 101 receives login information input on a login screen. The login screen is a setting screen for inputting the login information, which is constituted by a combination of the user identification information and a password. Note that the login screen is displayed on the display unit 473 by the control unit 100 in response to a login screen display instruction input via the operating unit 47, for example.

When the login information received by the login information reception unit 101 is stored in the login information storage unit 1701, the login authentication unit 103 logs in the user identified by the user identification information included in the login information. Note that here, the user is logged in specifically when the corresponding user identification information is stored in a predetermined area of a memory such as a RAM, for example. Hereafter, the RAM refers to the aforesaid RAM constituting the control unit 100.

The authorization limitation information acquisition unit 104 obtains the authorization limitation information corresponding to the user identification information included in the login information of the user from the authorization limitation information storage unit 1702 at the point where the user is logged in by the login authentication unit 103.

The execution instruction reception unit 105 displays setting screens corresponding to the functions that can be executed by the multifunction device 1a on the display unit 473, and receives an execution instruction to execute a function in accordance with execution conditions input into the corresponding setting screen by a logged-in user or a user who has not been logged in, who is the default user. Note that the control unit 100 executes the function in accordance with the execution conditions indicated in the received execution instruction in response to an instruction from the execution permission determination unit 106, to be described below.

When an execution instruction relating to a function is received by the execution instruction reception unit 105 and a logged-in user does not exist, the execution permission determination unit 106 determines that the user who inputted the received execution instruction is the default user. The execution permission determination unit 106 then determines whether to permit or prohibit execution of the execution subject function indicated in the execution instruction on the basis of the authorization limitation information corresponding to the user identification information indicating the default user, which is obtained by the authorization limitation information acquisition unit 104 at a timing before the execution instruction is received.

More specifically, the execution permission determination unit 106 performs this determination by determining whether or not the authorization limitation information corresponding to the user identification information indicating the default user includes the execution subject function. When the execution permission determination unit 106 determines that the execution subject function is included and therefore that execution of the execution subject function is permitted, the execution permission determination unit 106 transmits an instruction to execute the execution subject function to the control unit 100. When, on the other hand, the execution permission determination unit 106 determines that the execution subject function is not included and therefore that execution of the execution subject function is prohibited, the execution permission determination unit 106 displays the login screen on the display unit 473.

Note that the timing before the execution instruction to obtain the authorization limitation information relating to the default user is received will be described below. Obtaining the authorization limitation information relating to the default user means that the authorization limitation information corresponding to the user identification information indicating the default user is obtained by the authorization limitation information acquisition unit 104.

Further, when an execution instruction relating to a function is received by the execution instruction reception unit 105 and a logged-in user exists, the execution permission determination unit 106 determines that the user who inputted the received execution instruction is the logged-in user. The execution permission determination unit 106 then determines whether to permit or prohibit execution of the execution subject function indicated by the execution instruction on the basis of the authorization limitation information corresponding to login identification information for identifying the logged-in user, which is obtained by the authorization limitation information acquisition unit 104 at a timing before the execution instruction is received.

More specifically, the execution permission determination unit 106 performs this determination by determining whether or not the authorization limitation information corresponding to the login identification information for identifying the logged-in user includes the execution subject function. When the execution permission determination unit 106 determines that the execution subject function is included and therefore that execution of the execution subject function is permitted, the execution permission determination unit 106 transmits an instruction to execute the execution subject function to the control unit 100. When, on the other hand, the execution permission determination unit 106 determines that the execution subject function is not included and therefore that execution of the execution subject function is prohibited, the execution permission determination unit 106 does not transmit an instruction to execute the execution subject function to the control unit 100, and instead, for example, displays a message indicating that the execution subject function cannot be executed on the display unit 473.

The logout instruction reception unit 107 receives a logout instruction input on a logout screen. The logout screen is a setting screen for inputting the logout instruction. Note that the logout screen is displayed on the display unit 473 by the control unit 100 in response to a logout screen display instruction input via the operating unit 47, for example.

When a logout instruction is received by the logout instruction reception unit 107 and a logged-in user exists, the logout execution unit 108 determines that the user who inputted the received logout instruction is the logged-in user. Accordingly, the logout execution unit 108 logs out the user, deletes all of the execution conditions input by the user into the respective setting screens relating to the respective functions, and displays default conditions, which are execution conditions determined in advance in accordance with the respective functions, on the corresponding setting screens.

Next, the operation performed by the execution permission determination unit 106 to determine whether to permit or prohibit execution of a function will be described in detail using FIGS. 3, 4 and 5.

Figure 4:
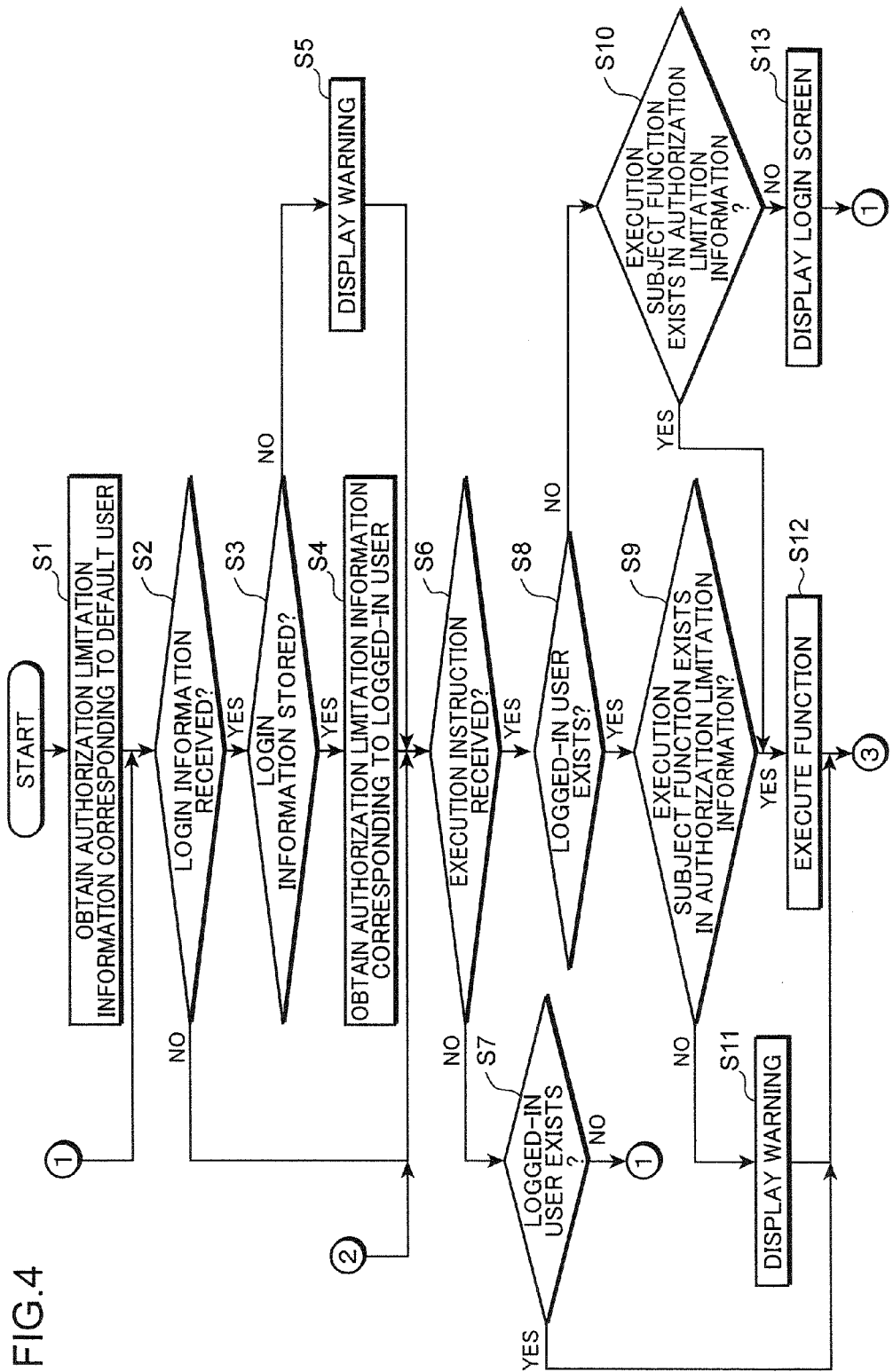
FIG. 4 is a flowchart showing an example of a first half of an operation for determining whether to permit or prohibit execution of a function in the first embodiment.

As shown in FIG. 4, first, at a point where power is supplied to the multifunction device 1a, the authorization limitation information acquisition unit 104 obtains the authorization limitation information Rdf corresponding to the user identification information indicating the default user (FIG. 3) from the authorization limitation information storage unit 1702 and stores the obtained authorization limitation information Rdf in the RAM (S1).

When login information input into the login screen displayed on the display unit 473 is subsequently received by the login information reception unit 101 (S2: YES), the login authentication unit 103 determines whether or not the received login information is stored in the login information storage unit 1701 (S3). The login screen is displayed on the display unit 473 when, for example, the control unit 100 displays the login screen on the display unit 473 in response to a login screen display instruction input via the operating unit 47 or the like.

When the login authentication unit 103 determines that the login information is stored in the login information storage unit 1701 (S3: YES), the login authentication unit 103 stores the user identification information included in the login information in the RAM in order to log in the user identified by the user identification information. At this point, the authorization limitation information acquisition unit 104 obtains the authorization limitation information corresponding to the user identification information from the authorization limitation information storage unit 1702 and stores the obtained authorization limitation information in the RAM (S4).

When, on the other hand, the login authentication unit 103 determines that the login information is not stored in the login information storage unit 1701 (S3: NO), the control unit 100 issues a warning that the login information is incorrect by displaying a message indicating that the login information is incorrect on the display unit 473 or the like, for example (S5).

Next, the operating unit 47 is operated such that an execution subject setting screen is displayed on the display unit 473 in the setting screens corresponding to the functions that can be executed by the multifunction device 1a. The logged-in user or the non-logged in default user inputs execution conditions on the setting screen displayed on the display unit 473. When an execution instruction to execute the function of an execution subject in accordance with the execution conditions is received by the execution instruction reception unit 105 (S6: YES), the execution permission determination unit 106 determines whether or not a logged-in user exists by determining whether or not the user identification information is stored in the RAM (S8).

For example, on a setting screen for inputting execution conditions relating to the monochrome copy function, an execution condition specifying "A5" as a size of the recording sheet and an execution condition specifying that two pages of the original are to be aggregated onto one page and thus printed are input via the operating unit 47. An execution instruction to execute the monochrome copy function in accordance with these execution conditions is then received by the execution instruction reception unit 105 (S6: YES).

After determining that a logged-in user exists (S8: YES), the execution permission determination unit 106 determines whether or not the authorization limitation information corresponding to the logged-in user, stored in the RAM in Step S4, includes the execution subject function indicated by the execution instruction received in Step S6 (S9).

After determining that the execution subject function (in other words, execution permission information indicating that execution of the execution subject function is permitted) is included (S9: YES), the execution permission determination unit 106 transmits an instruction to execute the execution subject function in accordance with the execution conditions indicated in the execution instruction to the control unit 100 (S12).

After determining that the execution subject function is not included (S9: NO), on the other hand, the execution permission determination unit 106 does not transmit an instruction to execute the execution subject function to the control unit 100. Instead, for example, the execution permission determination unit 106 issues a warning that the execution subject function cannot be executed by displaying a message indicating that the user does not have the right to execute the execution subject function on the display unit 473 or the like (S11).

Further, after determining in Step S8 that a logged-in user does not exist (S8: NO), the execution permission determination unit 106 determines whether or not the authorization limitation information corresponding to the default user, stored in the RAM in Step S1, includes the execution subject function indicated by the execution instruction received in Step S6 (S10).

After determining that the execution subject function is included (S10: YES), the execution permission determination unit 106 transmits an instruction to execute the execution subject function in accordance with the execution conditions indicated in the execution instruction to the control unit 100 (S12).

After determining that the execution subject function is not included (S10: NO), on the other hand, the execution permission determination unit 106 displays the login screen on the display unit 473 in a state where no logged-in users exist (S13), whereupon the routine returns to the processing of Step S2.

Note that in a case where the login information is not received, for example when the instruction to display the login screen is not input from the operating unit 47 or an instruction to switch to a different setting screen is input without inputting the login information into the login screen (S2: NO), the routine advances to Step S6.

Further, when the execution instruction is not received by the execution instruction reception unit 105 in Step S6 (S6: NO), the execution permission determination unit 106 determines whether or not a logged-in user exists by determining whether or not the user identification information is stored in the RAM (S7). Here, the execution instruction is an instruction to execute a function of the multifunction device 1a in accordance with the execution conditions relating to the function, which is input into the corresponding setting screen from the operating unit 47. When the execution permission determination unit 106 determines that a logged-in user does not exist (S7: NO), the routine returns to the processing of Step S2, and when the execution permission determination unit 106 determines that a logged-in user exists (S7: YES), the routine advances to Step S14, to be described below.

A specific example of the above operation will now be described in relation to a case such as shown in FIG. 3, in which the authorization limitation information Ra to Rc and the authorization limitation information Rdf are stored in the authorization limitation information storage unit 1702 in association with the user identification information A to C and the user identification information Df for identifying the default user, respectively.

First, a case in which an execution instruction relating to the monochrome copy function is received by the execution instruction reception unit 105 (S6: YES) through Steps S1 to S4 when the user corresponding to the user identification information A is logged in will be described. The execution permission determination unit 106, after determining that a logged-in user exists (S8: YES), determines that the authorization limitation information Ra corresponding to the user identification information A of the logged-in user includes the monochrome copy function serving as the execution subject function indicated by the execution instruction received in Step S6 (S9: YES). The authorization limitation information Ra is stored in the RAM in Step S4. Accordingly, the execution permission determination unit 106 transmits an instruction to execute the monochrome copy function in accordance with the execution conditions indicated in the execution instruction to the control unit 100 (S12).

Note that the processing of Step S6 is also performed in the second embodiment. In the second embodiment, processing of Step S20 (FIG. 7) is performed, and therefore a case in which an execution instruction relating to the monochrome copy function is received by the execution instruction reception unit 105 (S6: YES) may take the following form, for example. The setting screen for inputting the execution conditions of the monochrome copy function includes execution conditions (setting indicating that the size of the recording paper is A5 and so on, for example) already input by the default user. When a login-authenticated user performs editing to input further execution conditions (a reduction rate and so on, for example), an execution instruction relating to the monochrome copy function is received by the execution instruction reception unit 105. Step S20 will be described in the second embodiment.

Next, a case in which an execution instruction relating to the color copy function is received by the execution instruction reception unit 105 (S6: YES) through Steps S1 to S4 when the user corresponding to the user identification information A is logged in will be described. The execution permission determination unit 106, after determining that a logged-in user exists (S8: YES), determines that the authorization limitation information Ra corresponding to the user identification information A of the logged-in user does not include the color copy function serving as the execution subject function indicated by the execution instruction received in Step S6 (S9: NO). The authorization limitation information Ra is stored in the RAM in Step S4. Accordingly, the execution permission determination unit 106 does not transmit an instruction to execute the color copy function to the control unit 100, and instead displays a message indicating that the user does not have the right to execute the color copy function on the display unit 473 (S11).

A case in which an execution instruction relating to the monochrome copy function is received by the execution instruction reception unit 105 (S6: YES) when the login information is not received (S2: NO) following completion of Step S1 will now be described. The execution permission determination unit 106 determines that a logged-in user does not exist (S8: NO), and then determines that the authorization limitation information Rdf corresponding to the user identification information Df of the default user includes the monochrome copy function as the execution subject function indicated in the execution instruction received in Step S6 (S10: YES). The authorization limitation information Rdf is stored in the RAM in Step S1. Accordingly, the execution permission determination unit 106 transmits an instruction to execute the monochrome copy function in accordance with the execution conditions indicated in the execution instruction to the control unit 100 (S12).

A case in which an execution instruction relating to the color copy function, on the other hand, is received by the execution instruction reception unit 105 (S6: YES) when the login information is not received (S2: NO) following completion of Step S1 will now be described. The execution permission determination unit 106 determines that a logged-in user does not exist (S8: NO), and then determines that the authorization limitation information Rdf corresponding to the user identification information Df of the default user does not include the color copy function as the execution subject function indicated in the execution instruction received in Step S6 (S10: NO). The authorization limitation information Rdf is stored in the RAM in Step S1. Accordingly, the execution permission determination unit 106 displays the login screen in a state where no logged-in user exists on the display unit 473 (S13), whereupon the routine returns to the processing of Step S2.

Hence, the default user can input execution conditions into the setting screen corresponding to the function to be executed, regardless of whether or not the function to be executed is the default function that is permitted to be executed by the default user. When an execution instruction to execute the function in accordance with the execution conditions input by the default user is received but the execution subject function indicated in the execution instruction is not the default function, the login screen is displayed on the display unit 473.

Therefore, when a function for which the default user has instructed execution is not the default function, the default user can notice that she or he is not permitted to execute the function. Thereafter, the default user can avoid the labor required to input an instruction to display the login screen on the display unit 473 in order to log in as a user who is permitted to execute the function for which execution has been instructed.

Further, a logged-in user may input execution conditions into the setting screen corresponding to a function not included in the authorization limitation information corresponding to the user, which is stored in the authorization limitation information storage unit 1702, such that an execution instruction relating to the function is received. In this case, however, the execution permission determination unit 106 determines that the function indicated in the received execution instruction is not a function included in the authorization limitation information corresponding to the user, stored in the authorization limitation information storage unit 1702, and therefore execution of the function is avoided.

Next, Step S14 will be described. As shown in FIGS. 4 and 5, Step S14 is executed after Step S11 or Step S12, or when a logged-in user exists but a function execution instruction is not received (S6: NO, S7: YES). For example, the control unit 100 displays a logout screen on the display unit 473 in response to the logout screen display instruction input via the operating unit 47. When a logout instruction input into the logout screen displayed on the display unit 473 is received by the logout instruction reception unit 107 (S14: YES), the logout execution unit 108 determines whether or not a logged-in user exists according to whether or not the user identification information is stored in the RAM (S15).

After determining that a logged-in user exists (S15: YES), the logout execution unit 108 logs the user out by deleting the user identification information of the user that was stored in the RAM in Step S4 (S16). Further, the logout execution unit 108 deletes all of the execution conditions input by the user into the respective setting screens relating to the respective functions, and displays the default conditions, which are execution conditions determined in advance in accordance with the respective functions, on the corresponding setting screens (S17). The routine then returns to the processing of Step S2 in a state where no logged-in user exists.

This will now be described more specifically. For example, a logged-in user inputs an execution condition specifying that the size of the recording sheet is "A5" and an execution condition specifying that two pages of the original are to be condensed onto one page and thus printed into the setting screen for inputting execution conditions relating to the monochrome copy function. An execution instruction to execute the monochrome copy function in accordance with these execution conditions is then received by the execution instruction reception unit 105 (S6). Step S11 or Step S12 is then executed, whereupon a logout instruction is received by the logout instruction reception unit 107 (S14: YES). The logout execution unit 108 logs out the logged-in user (S15: YES, S16), and then cancels the execution conditions input into the setting screen, specifying that the size of the recording sheet is "A5" and that two pages of the original are to be condensed onto one page and thus printed. The logout execution unit 108 then displays the setting screen with the default conditions relating to the monochrome copy function, namely an execution condition specifying that the size of the recording sheet is "A4" and an execution condition specifying that the original is to be printed without being condensed, input therein (S17). The logout execution unit 108 then returns to the processing of Step S2 in a state where no logged-in user exists.

When the logout execution unit 108 determines that a logged-in user does not exist (S15: NO), on the other hand, the routine returns as is to the processing of Step S2 in a state where no logged-in user exists. Note that the following configuration may also be employed. For example, in Step S14, the control unit 100 may determine whether or not a logged-in user exists before displaying the logout screen such that when no logged-in user exists, the logout screen is not displayed. In this case, the logout instruction is not received (S14: NO).

Further, in a case where a logout instruction input into the logout screen is not received by the logout instruction reception unit 107 (S14: NO) after Step S11 or Step S12 is executed or when a logged-in user exists but a function execution instruction is not received (S6: NO, S7: YES), the routine returns to the processing of Step S6.

Hence, when a logout instruction is received by the logout instruction reception unit 107 (S14: YES) and a logged-in user exists (S15: YES), the logged-in user is logged out (S16). Further, all of the execution conditions input by the logged-in user into the respective setting screens relating to the respective functions are deleted, and the default conditions are displayed on the corresponding setting screens (S17). As a result, a user arriving immediately after this display processing can execute an operation to input desired execution conditions immediately, without being troubled by the execution conditions input into the respective setting screens by the previously logged-in user.

The first embodiment may be summarized as follows. The multifunction device 1a according to the first embodiment can be operated by both a logged-in user and a default user, who is a non-logged-in user. All users can input execution conditions (for example, recording sheet size, condensed copying, color copying) relating to the functions of the multifunction device 1a into the setting screens displayed prior to login as a default user. When an execution condition input into a setting screen displayed prior to login is not included in the execution conditions relating to the default function (color copying, for example), the login screen is displayed. At this time, an authentication key operation for displaying the login screen is not required to the user. Hence, when the user uses a function (monochrome copying, for example) assigned to the default user, labor required to operate the authentication key in order to display the login screen and labor required to input the login information (the user identification information and password, for example) into the login screen in order to log the user in can be eliminated. Further, when the user uses a function (color copying or color printing, for example) assigned only to logged-in users, labor required to operate the authentication key can be eliminated.

Second Embodiment

A second embodiment of the image forming apparatus according to the present disclosure will now be described. In the second embodiment, similarly to the first embodiment, when execution conditions input into a setting screen by a user who is not logged in are not execution conditions relating to a function assigned to the default user, the login screen is displayed without requiring the user to perform an operation to display the login screen. The user then inputs remaining execution conditions after logging in by inputting the login information into the login screen. In the second embodiment, the setting screens displayed after login are displayed in a state that the execution conditions input prior to login are input into the setting screens. As a result, labor required to re-input the execution conditions input prior to login can be eliminated.

FIG. 6 is a block diagram showing the internal configuration of the multifunction device 1b that serves as the image forming apparatus according to the second embodiment of the present disclosure. In the multifunction device 1b according to the second embodiment, blocks other than an execution condition continued display unit 109 and an execution condition storage unit 110 are identical to the blocks constituting the multifunction device 1a according to the first embodiment, shown in FIG. 2. Therefore, identical reference numerals have been allocated to these blocks and description thereof has been omitted. The execution condition continued display unit 109 and the execution condition storage unit 110 are included in the control unit 100.

The execution condition storage unit 110 is constituted by the RAM provided in the control unit 100, and stores the execution conditions input into the respective setting screens by the default user.

For example, when the user inputs an instruction to switch from a certain setting screen to another setting screen but the user is not logged in, the control unit 100 determines that the instruction has been input by a default user, and stores the execution conditions input into the setting screen displayed prior to the switch in the execution condition storage unit 110. Further, when the execution instruction reception unit 105 receives an execution instruction relating to a function but no logged-in user exists, the control unit 100 determines that the user who inputted the received execution instruction is a default user, and stores the execution conditions input into the setting screen relating to the execution subject function indicated by the execution instruction into the execution condition storage unit 110.

When the login authentication unit 103 logs in a user identified by the login information received by the login information reception unit 101, the execution condition continued display unit 109 displays the execution conditions input by the default user into the respective setting screens relating to the respective functions on the corresponding setting screens. The execution conditions referred to here are the execution conditions stored in the execution condition storage unit 110 at the point where the login information was received by the login information reception unit 101.

Next, the operation performed by the execution permission determination unit 106 to determine whether to permit or prohibit execution of a function will be described in detail using FIG. 7. A flowchart of the second embodiment, shown in FIG. 7, differs from the flowchart of the first embodiment, shown in FIG. 4, in that Step S20 is added between Step S4 and Step S6. The steps other than Step S20 were described in the first embodiment, and therefore description of these steps has been omitted. Processing indicated by a reference numeral 3 in FIG. 7 corresponds to the processing of the flowchart shown in FIG. 5. The flowchart shown in FIG. 5 was described in the first embodiment, and therefore description thereof has been omitted.

Following Step S4, the execution condition continued display unit 109 reads the execution conditions input by the default user, who is the non-logged-in user, into the respective setting screens relating to the respective functions from the execution condition storage unit 110, and displays the execution conditions on the corresponding setting screens (S20). The execution conditions referred to here are the execution conditions input into the respective setting screens relating to the respective functions by the default user who inputted his/her login information into the login screen at the point where the login information was received by the login information reception unit 101. Note that an operation to store the execution conditions input into the respective setting screens relating to the respective functions by the default user in the execution condition storage unit 110 will be described below.

It is assumed, for example, that an execution condition specifying that the size of the recording sheet is "A5" and an execution condition specifying that two pages of the original are to be condensed onto one page and thus printed are input via the operating unit 47 into the setting screen for inputting execution conditions relating to the monochrome copy function by the default user before the login information is received by the login information reception unit 101. When, in Step S4, a different user to the default user logs in, the execution condition continued display unit 109 displays, in Step S20, the execution condition specifying that the size of the recording sheet is "A5" and the execution condition specifying that two pages of the original are to be condensed onto one page and thus printed on the setting screen for inputting execution conditions relating to the monochrome copy function.

Hence, when the default user inputs the login information into the login screen such that the user identified by the login information is logged in, the execution conditions input by the default user into the respective setting screens relating to the respective functions are displayed as is on the corresponding setting screens. As a result, the amount of labor required of the logged-in user to re-input the execution conditions relating to the function into the setting screens can be reduced. This ends the description of Step S20.

An operation of the execution condition storage unit 110 will now be described. When a user inputs an instruction to switch from a certain setting screen to another setting screen before an execution instruction is received by the execution instruction reception unit 105 in Step S6, the control unit 100 determines whether or not a logged-in user exists. When a logged-in user does not exist, the control unit 100 determines that the instruction was input by the default user, and stores the execution conditions input into the setting screen displayed prior to the switch in the execution condition storage unit 110. Further, when an execution instruction relating to a function is received by the execution instruction reception unit 105 in Step S6 but a logged-in user does not exist, the control unit 100 determines that the user who inputted the received execution instruction is a default user. The control unit 100 then stores the execution conditions input into the setting screen relating to the execution subject function indicated by the execution instruction in the execution condition storage unit 110.

The second embodiment may be summarized as follows. In the second embodiment, similarly to the first embodiment, the login screen is displayed when the execution conditions input into a setting screen by a non-logged-in user are not execution conditions relating to a function assigned to the default user. In the second embodiment, however, the setting screens displayed after login are displayed in a state that the execution conditions input prior to login are input into the setting screens.

This will now be described more specifically. It is assumed that the default user can use the monochrome copy function but not the color copy function. Further, it is assumed that the default user inputs A4 as the size of the recording sheet and 2 in 1 as the aggregated copying condition, for example, into a copy mode setting screen. At this time, the monochrome copy function is set as the default. When the default user performs input to select the color copy function, the login screen is displayed. When the user logs in by inputting the login information into the login screen, a setting screen on which A4 and 2 in 1 have been input as the size of the recording sheet and the condensed copying condition, respectively, is displayed.

Hence, according to the second embodiment, labor required to re-input execution conditions input prior to login can be eliminated.

The first and second embodiments may include following first and second aspects.

First Aspect

The multifunction devices 1a, 1b include a mode execution unit that executes a default user mode in which login is not performed by the login authentication unit 103, from among a logged-in user mode in which login is performed by the login authentication unit 103 and the default user mode, as an initial mode in which an operation of the multifunction devices 1a, 1b is started.

In the default user mode, all users can use the function (monochrome copying, for example) assigned to the default user without the need for login authentication. According to the first aspect, the default user mode is executed as the initial mode in which the operation of the multifunction devices 1a, 1b is started. As a result, all users can use the function assigned to the default user without performing an operation to select the default user mode. The mode execution unit is included in the control unit 100 shown in FIGS. 2 and 6.

Second Aspect

A setting screen displayed before login is performed by the login authentication unit 103 includes an authentication key for displaying the login screen, and the multifunction devices 1a, 1b include a display control unit that displays the login screen on the display unit 473 when the authentication key is operated.

When a user inputs an execution condition (color copying, for example) relating to a function assigned only to a logged-in user while inputting a plurality of execution conditions as the default user, the input operation is interrupted and the login screen is displayed automatically. The user logs in by inputting the login information into the login screen, and then inputs the remaining execution conditions (enlargement/reduction, for example). In this case, the execution condition input operation is interrupted regardless of the will of the user, and therefore the user may forget the execution conditions to be input following login. According to the second aspect, the login screen can be displayed and login can be performed in accordance with the will of the user. As a result, the user is less likely to forget the execution conditions to be input following login. The display control unit is included in the control unit 100 shown in FIGS. 2 and 6.

In addition to the multifunction devices 1a, 1b described above, the image forming apparatus according to the present disclosure may be applied to an image forming apparatus such as a printer, a copier, and a scanner device.

Further, in the embodiments described above, the configurations and settings illustrated in FIGS. 1 to 7 are merely examples, and the present disclosure is not limited to these embodiments.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image forming apparatus comprising:
a display unit that displays respective setting screens for inputting execution conditions relating to respective functions that can be executed by the image forming apparatus;
a login information storage unit that stores login information for authenticating a user having permission to use the image forming apparatus in advance;
a login information reception unit that receives the login information, which is input into a login screen serving as the setting screen for inputting the login information;
a login authentication unit that logs in a user identified by the login information received by the login information reception unit, when the received login information is stored in the login information storage unit;
an authorization limitation information storage unit that stores functions permitted to be executed respectively by the logged-in user and a default user, who is a non-logged-in user;
an execution instruction reception unit that displays the setting screen corresponding to the function that can be executed by the image forming apparatus on the display unit and receives an execution instruction to execute the function in accordance with the execution conditions input into the setting screen by the logged-in user or the default user;
a control unit that executes the function in accordance with the execution conditions indicated in the execution instruction received by the execution instruction reception unit;
an execution permission determination unit which, when the execution instruction input by the default user is received by the execution instruction reception unit, determines whether or not the function of an execution subject indicated in the received execution instruction is a default function, which is a function that is permitted to be executed by the default user, stored in the authorization limitation information storage unit, causes the control unit to execute the function after determining that the function is the default function, and displays the login screen on the display unit after determining that the function is not the default function;

an execution condition storage unit that stores the execution conditions input into the respective setting screens by the default user before the user is logged in by the login authentication unit; and an execution condition contained display unit which, after the execution conditions are input into the respective setting screens by the default user, reads the execution conditions input into the respective setting screens by the default user from the execution conditions and displays in a state that the execution conditions are input into the respective setting screens when the default user is logged in by the login authentication unit.

2. The image forming apparatus according to claim 1, wherein, when the execution instruction input by the logged-in user is received by the execution instruction reception unit, the execution permission determination unit determines whether or not the function of an execution subject indicated by the received execution instruction is a function that is permitted to be executed by the user, which is stored in the authorization limitation information storage unit, causes the control unit to execute the function of an execution subject after determining that the function of an execution subject is a function that is permitted to be executed by the user, and does not cause the control unit to execute the function of an execution subject after determining that the function of an execution subject is a function that is not permitted to be executed by the user.

3. The image forming apparatus according to claim 1, further comprising:

a logout instruction reception unit that receives a logout instruction input into a logout screen, which is the setting screen for inputting the logout instruction; and a logout execution unit which, when the logout instruction input by the logged-in user is received by the logout instruction reception unit, logs the user out, deletes all of the execution conditions input by the user into the respective setting screens relating to the respective functions, and displays default conditions, which are execution conditions determined in advance in accordance with the respective functions, in a state that the execution conditions are input into the respective setting screens.

4. The image forming apparatus according to claim 1, further comprising a mode execution unit that executes, as an initial mode in which an operation of the image forming apparatus is started, a default user mode in which login is not performed by the login authentication unit, from among a logged-in user mode in which login is performed by the login authentication unit and the default user mode.

5. The image forming apparatus according to claim 1, wherein a setting screen displayed prior to login by the login authentication unit includes an authentication key for displaying the login screen, and The image forming apparatus further comprises a display control unit that displays the login screen on the display unit when the authentication key is operated.

6. A control method for an image forming apparatus, comprising:

an execution step of executing, as an initial mode in which an operation of the image forming apparatus is started, a default user mode in which a user who operates the image forming apparatus is not logged in, from among a logged-in user mode in which the user who operates the image forming apparatus is logged in and the default user mode;

a first display step of displaying a setting screen for inputting an execution condition for causing the image forming apparatus to execute a function in the default user mode executed in the execution step;

a determination step of determining, when the execution condition is input into the setting screen displayed in the first display step, whether or not the input execution condition is an execution condition of a function assigned to a default user;

a second display step of displaying a login screen for inputting login information required to advance to the logged-in user mode without requiring the user to perform an operation, when the input execution condition is determined in the determination step not to be the execution condition of the function assigned to the default user;

a storage step of storing the execution conditions input into the setting screen displayed in the first display step;

an authentication step of determining whether or not to log in the user when the login information is input into the login screen displayed in the second display step after the storage step; and a third display step of displaying the setting screen on which the execution condition stored in the storage step is input when the user is logged in in the authentication step such that the logged-in user mode is established.

* * * * *